UNITED STATES PATENT OFFICE.

SOLOMON W. KIRK, OF PHILADELPHIA, PENNSYLVANIA, ASSIGNOR TO HIMSELF AND HENRY THOMAS, OF SAME PLACE.

IMPROVEMENT IN FLUXES FOR WORKING METALS AND MINERALS.

Specification forming part of Letters Patent No. 109,021, dated November 8, 1870.

*To all whom it may concern:*

Be it known that I, SOLOMON W. KIRK, of the city and county of Philadelphia, and State of Pennsylvania, have invented a new and Improved Flux for Working Metals or Minerals; and I do hereby declare that the following is a description of the ingredients and proportions used in preparing the same.

The object of my invention is to provide a flux or reagent for working all kinds of metals or minerals.

To enable those skilled in the art of working metals to use my invention, I will now proceed to give the proportions of the various chemicals used in preparing my invention.

The flux may be prepared in different ways, as follows: First, by taking twenty pounds (20 lbs.) of caustic potash and mixing with it one pound (1 lb.) of cyanide of potassium; second, by taking twenty pounds (20 lbs.) of caustic soda and mixing with it one pound (1 lb.) of cyanide of potassium; third, by taking one pound (1 lb.) of cyanide of potassium and mixing with it ten pounds (10 lbs.) of caustic potash and ten pounds of caustic soda. Either of the above may be used in working metals or minerals in a crucible or in a furnace.

I do not wish to limit myself to any of the proportions above given, as more or less of each article may be used.

Having thus described my invention, what I claim, and desire to secure by Letters Patent, is—

1. The combination of caustic potash with cyanide of potassium, as and for the purpose herein specified.

2. The combination of caustic soda with cyanide of potassium, as and for the purpose herein specified.

3. The combination of cyanide of potassium with caustic potash and soda, as and for the purpose herein specified.

In testimony whereof I have hereunto signed my name in the presence of two subscribing witnesses.

S. W. KIRK.

Witnesses:
 ISAAC R. OAKFORD,
 GEO. E. NICHOLS.